(12) United States Patent
Forster (10) Patent No.: US 11,769,938 B2
(45) Date of Patent: Sep. 26, 2023

(54) RFID TAGS OPERATING IN THE HIGH FREQUENCY BAND

(71) Applicant: AVERY DENNISON RETAIL INFORMATION SERVICES, LLC, Mentor, OH (US)

(72) Inventor: Ian J. Forster, Chelsmford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 16/454,939

(22) Filed: Jun. 27, 2019

(65) Prior Publication Data

US 2020/0006840 A1   Jan. 2, 2020

Related U.S. Application Data

(60) Provisional application No. 62/690,723, filed on Jun. 27, 2018.

(51) Int. Cl.
*H01Q 1/22* (2006.01)
*G06K 19/077* (2006.01)
*H01Q 7/00* (2006.01)

(52) U.S. Cl.
CPC ..... *H01Q 1/2225* (2013.01); *G06K 19/07749* (2013.01); *H01Q 7/00* (2013.01)

(58) Field of Classification Search
CPC ... H01Q 1/2225; H01Q 7/00; G06K 19/07749
See application file for complete search history.

(56) References Cited

U.S. PATENT DOCUMENTS

| D383,465 S | 9/1997 | Chen |
| 6,142,381 A | 11/2000 | Finn et al. |
| 6,924,688 B1 | 8/2005 | Beigel |
| 7,214,569 B2 | 5/2007 | Swindlehurst et al. |

(Continued)

FOREIGN PATENT DOCUMENTS

| CN | 102119395 | 7/2011 |
| CN | 104541316 | 4/2015 |

(Continued)

OTHER PUBLICATIONS

International Search and Written Opinion dated Oct. 1, 2019 issued in corresponding IA No. PCT/US2019/039485 filed Jun. 27, 2019.

(Continued)

*Primary Examiner* — Dieu Hien T Duong (57) ABSTRACT

A high-field emission tolerant RFID tag device that may be secured to a product to be cooked, heated, reheated and/or thawed in a heating apparatus such as, but not limited to, a microwave oven and that does not need to be removed from the product before initiating the heating process. The RFID device is microwave safe and does not damage the product or food item to which it is attached during the microwave process, and may contain data to control the microwave process. The microwave safe RFID tag comprises a split ring (or shield) conductor formed on one side of a substrate (or dielectric), a coil antenna conductor formed on an opposite side of the substrate, and a RFID chip. The split ring conductor capacitively couples to the coil antenna conductor via the dielectric and a gap in the split ring conductor prevents arcing.

19 Claims, 9 Drawing Sheets

(56) References Cited

U.S. PATENT DOCUMENTS

| | | |
|---|---|---|
| D546,819 S | 7/2007 | Oliver |
| D553,124 S | 10/2007 | Joughin et al. |
| 7,471,173 B2 | 12/2008 | Hidaka et al. |
| 7,500,610 B1 * | 3/2009 | Hadley ............ G06K 19/07718 235/451 |
| 7,535,366 B2 | 5/2009 | Egbert et al. |
| D634,738 S | 3/2011 | Lim et al. |
| 8,179,329 B2 | 5/2012 | Kato |
| 8,289,165 B2 | 10/2012 | Forster |
| 8,473,235 B2 | 6/2013 | Kittel et al. |
| 8,511,569 B1 | 8/2013 | Koepp et al. |
| D697,900 S | 1/2014 | Yang et al. |
| D716,774 S | 11/2014 | Forster et al. |
| 9,070,563 B2 | 6/2015 | Yamazaki et al. |
| 9,378,451 B2 | 6/2016 | Forster |
| 9,418,262 B1 | 8/2016 | Gentile et al. |
| 9,595,211 B2 | 3/2017 | Um et al. |
| D809,489 S | 2/2018 | Burkholder et al. |
| D812,045 S | 3/2018 | Howard |
| D826,220 S | 8/2018 | He |
| D837,769 S | 1/2019 | Yang |
| 10,186,765 B2 | 1/2019 | Coleman et al. |
| 10,243,255 B2 | 3/2019 | Rokhsaz et al. |
| 10,268,945 B1 | 4/2019 | Keller et al. |
| 10,311,355 B1 | 6/2019 | Hahn et al. |
| D855,039 S | 7/2019 | Naweed |
| D880,460 S | 4/2020 | Forster |
| 10,665,922 B2 | 5/2020 | Takahashi et al. |
| 10,846,585 B1 | 11/2020 | Keller et al. |
| 2002/0157411 A1 | 10/2002 | Ishikawa et al. |
| 2004/0089707 A1 | 5/2004 | de Cortina et al. |
| 2004/0238534 A1 | 12/2004 | Mast |
| 2005/0001785 A1 | 1/2005 | Ferguson et al. |
| 2005/0091996 A1 | 5/2005 | Ishikawa et al. |
| 2006/0043198 A1 | 3/2006 | Forster |
| 2006/0044192 A1 | 3/2006 | Egbert |
| 2006/0054710 A1 | 3/2006 | Forster et al. |
| 2006/0145872 A1 | 7/2006 | Tanaka et al. |
| 2007/0063057 A1 | 3/2007 | Masubuchi et al. |
| 2007/0069859 A1 | 3/2007 | Bae et al. |
| 2007/0132593 A1 | 6/2007 | Yamazaki |
| 2007/0164859 A1 | 7/2007 | Cobianu et al. |
| 2007/0171129 A1 | 7/2007 | Coleman et al. |
| 2007/0194935 A1 | 8/2007 | Ayala et al. |
| 2007/0238245 A1 | 10/2007 | Cote et al. |
| 2008/0105673 A1 | 5/2008 | Ikeda et al. |
| 2008/0122631 A1 | 5/2008 | Kodukula et al. |
| 2008/0143480 A1 | 6/2008 | Egbert et al. |
| 2008/0220721 A1 | 9/2008 | Downie et al. |
| 2009/0109002 A1 | 4/2009 | Hadley et al. |
| 2009/0179817 A1 * | 7/2009 | Yin ...................... H01Q 1/2225 343/866 |
| 2009/0236334 A1 | 9/2009 | Ben-Shmuel et al. |
| 2009/0309703 A1 * | 12/2009 | Forster ...................... H01Q 7/04 340/10.1 |
| 2010/0000980 A1 | 1/2010 | Popescu |
| 2010/0001079 A1 * | 1/2010 | Martin ............... G08B 13/2414 235/492 |
| 2010/0117819 A1 | 5/2010 | Murray |
| 2010/0141452 A1 | 6/2010 | Lian et al. |
| 2010/0213187 A1 | 8/2010 | Bandholz et al. |
| 2010/0302013 A1 | 12/2010 | Kato et al. |
| 2011/0025466 A1 | 2/2011 | Stone |
| 2011/0133904 A1 | 6/2011 | Warther |
| 2011/0147467 A1 | 6/2011 | Choi |
| 2011/0253975 A1 | 10/2011 | Kato |
| 2012/0061473 A1 | 3/2012 | Forster et al. |
| 2012/0062367 A1 | 3/2012 | Warther |
| 2012/0111950 A1 | 5/2012 | Worrall et al. |
| 2013/0002404 A1 | 1/2013 | Takeoka et al. |
| 2013/0087625 A1 | 4/2013 | Kato |
| 2013/0299583 A1 | 11/2013 | Wilkinson |
| 2013/0306626 A1 | 11/2013 | Torres et al. |
| 2013/0313328 A1 | 11/2013 | Mohajer-Iravani et al. |
| 2014/0034739 A1 | 2/2014 | Forster et al. |
| 2015/0076238 A1 | 3/2015 | Koskelainen |
| 2015/0144702 A1 | 5/2015 | Mei et al. |
| 2016/0003895 A1 | 1/2016 | Farr et al. |
| 2016/0345389 A1 | 11/2016 | Torres et al. |
| 2017/0214142 A1 | 8/2017 | Rokhsaz et al. |
| 2018/0092486 A1 | 4/2018 | Kwon et al. |
| 2018/0189623 A1 | 7/2018 | Forster et al. |
| 2019/0325282 A1 | 10/2019 | Forster et al. |
| 2020/0005110 A1 | 1/2020 | Forster |
| 2020/0160005 A1 | 5/2020 | Volpi et al. |

FOREIGN PATENT DOCUMENTS

| | | |
|---|---|---|
| CN | 208423178 U | 1/2019 |
| CN | 109389203 | 2/2019 |
| DE | 102008054711 | 6/2009 |
| EP | 1174667 | 1/2002 |
| EP | 1479619 | 11/2004 |
| EP | 2306588 | 4/2011 |
| EP | 3828771 | 6/2021 |
| GB | 2554952 | 4/2018 |
| JP | 2001-317741 | 11/2001 |
| JP | 2002150248 A * | 5/2002 |
| JP | 2003-030612 | 1/2003 |
| JP | 2003-087044 | 3/2003 |
| JP | 2005-101987 | 4/2005 |
| JP | 2005-216044 | 8/2005 |
| JP | 2005-252853 | 9/2005 |
| JP | 2005-323019 | 11/2005 |
| JP | 2006-132793 | 5/2006 |
| JP | 2007-086863 | 4/2007 |
| JP | 2007-089054 | 4/2007 |
| JP | 2010-045467 | 2/2010 |
| JP | 2010-212853 | 9/2010 |
| JP | 2010-231797 | 10/2010 |
| JP | 2010-263404 | 11/2010 |
| JP | 2011-100181 | 5/2011 |
| JP | 2011-227668 | 11/2011 |
| JP | 2014-003452 | 1/2014 |
| JP | 2016-532901 | 10/2016 |
| JP | 2018-163643 | 10/2018 |
| WO | 2002/099764 | 12/2002 |
| WO | 2006/048964 | 11/2006 |
| WO | 2008/084917 | 7/2008 |
| WO | 2009/110381 | 9/2009 |
| WO | 2010/079830 | 7/2010 |
| WO | 2011/159716 | 12/2011 |
| WO | 2014/210000 | 12/2014 |
| WO | 2017/094794 | 6/2017 |
| WO | 2017/126418 | 7/2017 |
| WO | 2018/125977 | 7/2018 |
| WO | 2019/046429 | 3/2019 |

OTHER PUBLICATIONS

International Search Report and Written Opinion dated Jun. 8, 2018 issued in corresponding IA No. PCT/US2017/068659 filed Dec. 28, 2017.

International Preliminary Report on Patentability dated Jul. 11, 2019 issued in corresponding IA No. PCT/US2017/068659 filed Dec. 28, 2017.

International Preliminary Report on Patentability dated Oct. 20, 2020 issued in corresponding IA No. PCT/US2019/028281 filed Apr. 19, 2019.

International Search Report and Written Opinion dated Aug. 5, 2019 issued in corresponding IA No. PCT/US2019/028281 filed Apr. 19, 2019.

International Preliminary Report on Patentability dated Oct. 29, 2020 issued in corresponding IA No. PCT/US2019/028275 filed Apr. 19, 2019.

International Search Report and Written Opinion dated Jul. 12, 2019 issued in corresponding IA No. PCT/US2019/028275 filed Apr. 19, 2019.

International Search Report and Written Opinion dated Sep. 10, 2019 issued in corresponding IA No. PCT/US2019/028268 filed Apr. 19, 2019.

(56) References Cited

OTHER PUBLICATIONS

International Preliminary Report on Patentability dated Oct. 29, 2020 issued in corresponding IA No. PCT/US2019/028268 filed Apr. 19, 2019.
International Search Report and Written Opinion dated Oct. 11, 2019 issued in corresponding IA No. PCT/US2019/039460 filed Jun. 27, 2019.
International Preliminary Report on Patentability dated Dec. 29, 2020 issued in corresponding IA No. PCT/US2019/039485 filed Jun. 27, 2019.
International Search Report and Written Opinion dated Mar. 31, 2021 issued in corresponding IA No. PCT/US2020/067168 filed Dec. 28, 2020.
International Search Report and Written Opinion dated Mar. 30, 2021 issued in corresponding IA No. PCT/US2020/067115 filed Dec. 28, 2020.
International Preliminary Report on Patentability dated Dec. 29, 2020 issued in corresponding IA No. PCT/US2019/039460 filed Jun. 27, 2019.
International Preliminary Report on Patentability dated Jul. 5, 2022 issued in corresponding IA No. PCT/US2020/067115 filed Dec. 28, 2020.
International Preliminary Report on Patentability dated Jun. 28, 2022 issued in corresponding IA No. PCT/US2020/067168 filed Dec. 28. 2020.

* cited by examiner

RFID TAGS OPERATING IN THE HIGH FREQUENCY BAND

CROSS REFERENCE TO RELATED APPLICATIONS

The present application claims priority to and the benefit of U.S. provisional utility patent application No. 62/690,723 filed Jun. 27, 2018, which is incorporated herein by reference in its entirety.

BACKGROUND

The present invention relates generally to a radio-frequency identification ("RFID") tag that can withstand a high-emission field such as, but not limited to that of a microwave oven, and a method of using a high-emission field tolerant RFID tag to control aspects of a heating process, such as that by a microwave. Specifically, the RFID tag does not need to be removed from a product or food item before cooking or heating in an apparatus such as a microwave. The microwave safe RFID tag of the present invention prevents an arc from being formed, and therefore can be placed inside a microwave oven without damaging the product or food item to which it is attached. Therefore, the RFID tag can be read or interrogated by a RFID reader system during the high-powered high-field or microwave emission.

Although other RFID technologies can be used, the disclosure focuses on high frequency ("HF"), operating at 13.56 MHz and ultra-high frequency ("UHF") technology, operating at various bands worldwide including 865-868 MHz in Europe and 902-928 MHz in the United States. Accordingly, the present specification makes specific reference thereto. However, it is to be appreciated that aspects of the present inventive subject matter are also equally amenable to other like applications.

Generally stated, radio-frequency identification is the use of electromagnetic energy to stimulate a responsive device (known as an RFID "tag" or transponder) to identify itself and, in some cases, provide additionally stored data in the tag. RFID tags typically include a semiconductor device commonly called the "chip" on which are formed a memory and operating circuitry, which is connected to an antenna. Typically, RFID tags act as transponders, providing information stored in the chip memory in response to a radio frequency ("RF") interrogation signal received from a reader, also referred to as an interrogator. In the case of passive RFID devices, the energy of the interrogation signal also provides the necessary energy to operate the RFID tag device.

RFID tags may be incorporated into or attached to articles to be tracked. In some cases, the tag may be attached to the outside of an article with adhesive, tape, or other means and in other cases, the tag may be inserted within the article, such as being included in the packaging, located within the container of the article, or sewn into a garment. The RFID tags are manufactured with a unique identification number which is typically a simple serial number of a few bytes with a check digit attached. This identification number is incorporated into the tag during manufacture. The user cannot alter this serial/identification number and manufacturers guarantee that each serial number is used only once. Such read-only RFID tags typically are permanently attached to an article to be tracked and, once attached, the serial number of the tag is associated with its host article in a computer data base.

Currently, RFID technology implemented in food items to be cooked in a microwave oven cannot survive the high-field emissions of a microwave oven. More specifically, the RFID tag is typically destroyed in the microwave oven cavity and may also damage the food item to which the RFID tag is attached. Therefore, microwave safe RFID tag devices that can function within a microwave oven and that do not damage the food item to which the RFID tag is attached are needed.

The present invention discloses a microwave safe RFID tag that is secured to a food item or other product to be cooked, heated, reheated and/or thawed in a microwave oven, and that does not need to be removed from the food item or product before initiating the microwave process. Further, the RFID tag can be placed inside a microwave oven without damaging the food item or product to which the RFID tag is attached and provides data for controlling the cooking process.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a microwave safe RFID tag device that is secured to a food item or other product to be cooked, heated, reheated and/or thawed in a microwave oven. The RFID tag may include a wide variety of information including, without limitation, information about the product to which it is attached, the user of the RFID tag, instructions for the operation of the microwave oven, etc.

The microwave safe RFID tag preferably comprises a split ring (or shield) conductor formed on one side of a dielectric, a coil antenna conductor formed on an opposite side of the dielectric, and a RFID chip. The split ring conductor is separated from the coil antenna conductor by a dielectric. Further, the split ring conductor covers the majority of the coil antenna conductor, such that the split ring conductor capacitively couples to the coil antenna conductor via the dielectric. Additionally, the split ring conductor comprises a gap which allows the microwave current to flow through the coil antenna conductor, yet no part of the coil antenna conductor in the gap interacts with the microwave current, which prevents arcing.

In another embodiment, the microwave safe RFID tag device comprises a second split ring conductor which is rotated opposite of the first split ring conductor such that the gaps of the conductors do not align and current does not flow in the gaps. The coil antenna conductor is then positioned between the first and the second split ring conductors and capacitively couples to the conductors, effectively shorting the coil antenna conductor and the first and the second split ring conductors to prevent arcing and excessive current flow along the coil antenna conductor.

In a further embodiment of the present invention, the microwave safe RFID tag comprises a RFID chip and shielded strap positioned on the coil antenna conductor with the split ring conductor formed on top of the RFID chip and shielded strap. Specifically, the RFID chip is secured to a center and an outside edge of the coil antenna conductor creating a resonant circuit.

While the discussion contained herein primarily references food items placed into a microwave oven for purposes of cooking, thawing, heating or reheating said food item, it should be appreciated that the present invention is not limited to use with food items. More specifically, the present invention has application in any other setting or process in which it is desirable to attach an RFID tag to an article to be placed in or near a microwave oven or field, such as in a manufacturing process.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a RFID tag that is tolerant to high-field emissions and may be considered microwave safe such that the tag does not need to be removed from a product, such as a food item, before cooking, thawing, heating and/or reheating in an apparatus such as in a microwave, and that can provide data to control the cooking process. The RFID tag, in one embodiment, comprises a split ring (or shield) conductor formed on one side of a substrate (or dielectric), a coil antenna conductor formed on an opposite side of the substrate, and a RFID chip. The split ring conductor capacitively couples to the coil antenna conductor via the dielectric and a gap in the split ring conductor prevents arcing. Further, the RFID chip may carry data related to the product or food item to which the RFID is attached and/or the process that the microwave oven is required to perform. The data on the RFID chip is read by an RFID reader system to authorize and/or control the microwave process, for example, to cook, heat, reheat or thaw a food item.

Figure 1:
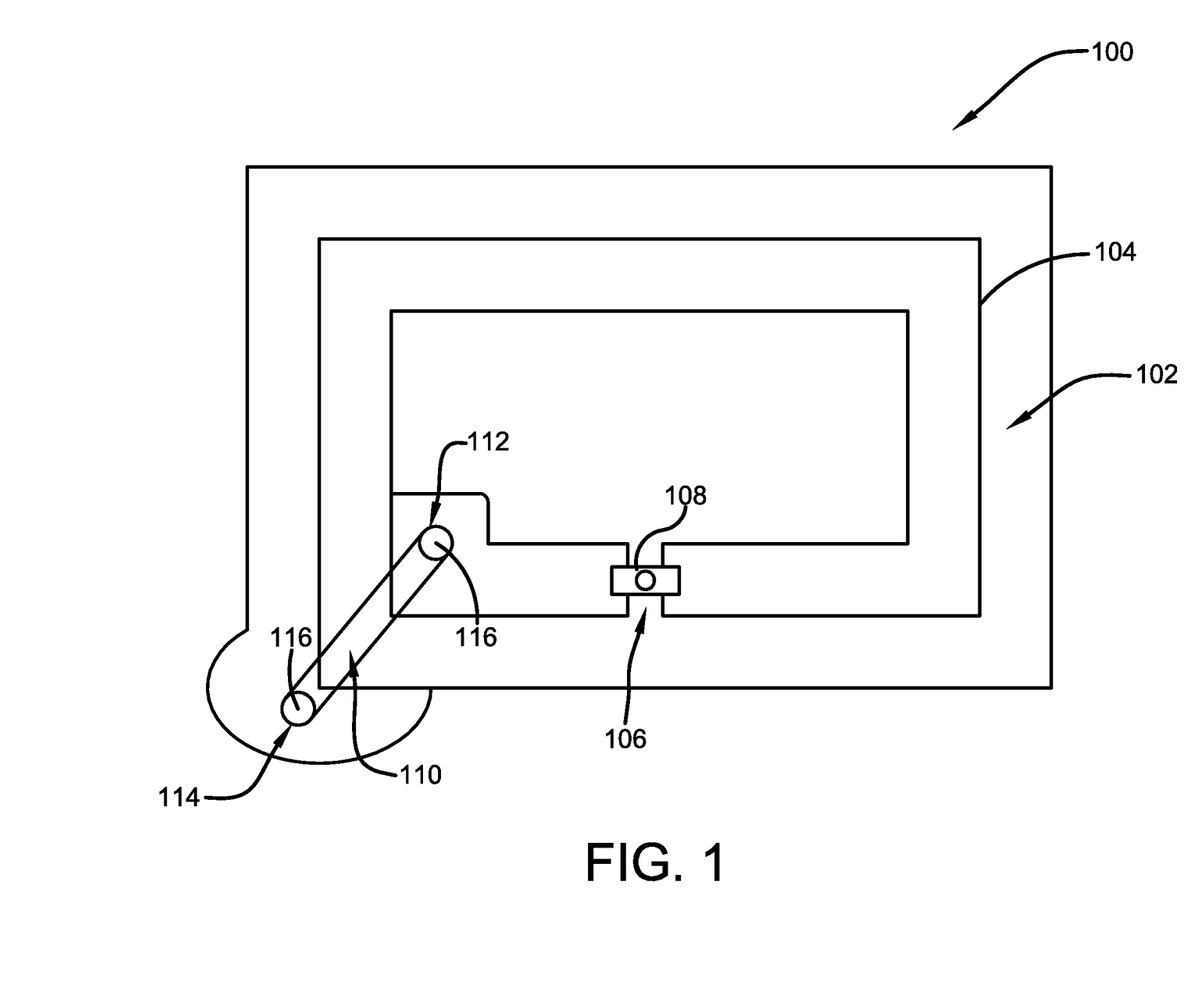
FIG. 1 illustrates a top perspective view of a basic HF RFID tag in accordance with the disclosed architecture.

Referring initially to the drawings, FIG. 1 illustrates a standard high frequency (HF) RFID tag device 100. The HF RFID tag device 100, in one embodiment, is a planar structure of conductive antenna components 102 in a spiral type configuration, or any other suitable configuration as is known in the art. Further, the planar structure is shown as a rectangle, but can be any suitable shape as is known in the art, such as a circle, square, or triangle, etc. The planar structure with the spiral type configuration creates plurality of gaps 104 between the conductive antenna components 102. Additionally, a gap 106 in the conductive antenna component 102 itself is where a RFID chip 108 is positioned, such that the RFID chip 108 is placed into the coil of the conductive antenna component 102. Further, the center 112 of the HF RFID tag device 100 and the outer edge 114 of the planar structure of conductive antenna components 102 are bridged together with a conductive trace 116 creating an inductor (or bridge conductor) 110 across the HF RFID tag device 100 and resonating at the wanted frequency.

Typically, HF RFID tags operate in the band of 100 kHz to 15 MHz, with a particular standard frequency of 13.56 MHz. Further, typical read ranges are up to approximately 1 m; however, for a number of applications with mobile devices such as a cell phone operating according to the Near Field Communications (NFC) standard, ranges can only be 10-15 mm depending on RFID tag size. The distance between tag and reader is in the near field, and the coupling is primarily magnetic, and a coil type antenna of an inductance designed to resonate with the RFID chip capacitance is typically used.

Figure 2:
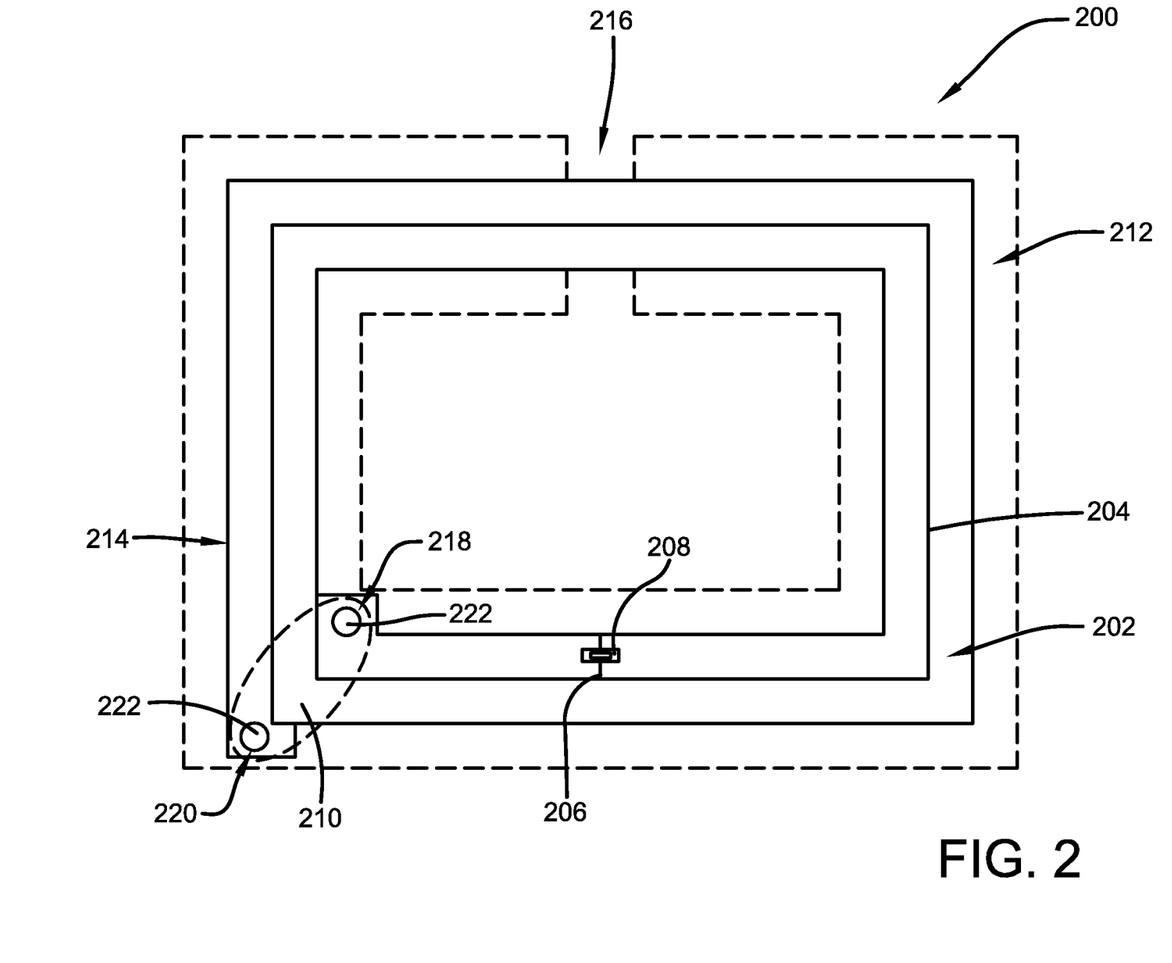
FIG. 2 illustrates a top perspective view of a microwave safe RFID tag in accordance with the disclosed architecture.

As shown in FIG. 2, RFID tag 200 that is high-emission field tolerant and generally recognized as microwave safe is shown which is designed to be placed inside a heating apparatus without damaging the food item or other product the RFID tag 200 is attached to. The RFID tag 200 can be secured by any suitable means as is known in the art to the food item such as by a GRAS (Generally Recognized As Safe) adhesive. Further, the RFID tag 200 can be a dual mode tag or a single mode tag and may comprise a HF core component which communicates with a HF reader system, as described in FIG. 1. Typically, the RFID tag 200 can be any suitable size, shape, and configuration as is known in the art without affecting the overall concept of the invention.

One of ordinary skill in the art will appreciate that the shape and size of the RFID tag 200 as shown in FIG. 2 is for illustrative purposes only and many other shapes and sizes of the RFID tag 200 are well within the scope of the present disclosure. Although dimensions of the RFID tag 200 (i.e., length, width, and height) are important design parameters for good performance, the RFID tag 200 may be any shape or size that ensures optimal performance during use.

The RFID tag device 200 capable of withstanding a microwave oven comprises, in one embodiment, a planar structure of conductive antenna components 202 in a spiral type configuration, or any other suitable configuration as is known in the art. The present invention contemplates that the conductive antenna components 202 are metallic, but can be manufactured of any suitable material as is known in the art. Further, the planar structure is shown as a rectangle, but can be any suitable shape as is known in the art, such as a circle, square, or triangle, etc. The planar structure with the spiral type configuration creates gaps 204 between the conductive antenna components 202. Additionally, at least one gap 206 in the conductive antenna component 202 itself is where a RFID chip 208 is positioned, such that the RFID chip 208 is placed into a coil of the conductive antenna component 202.

Further, the center 218 of the microwave safe RFID tag device 200 and the outer edge 220 of the planar structure of conductive antenna components 202 may be bridged together with a conductive trace 222 creating an inductor (or bridge conductor) 210 across the microwave safe RFID tag device 200 and resonating at the wanted frequency. Furthermore, the microwave safe RFID tag device 200 comprises a second conductor 212 in the form of a split ring, or any other suitable shape as is known in the art. This second conductor (or ring conductor) 212 is separated from the bridge conductor (or coil conductor) 210 by a dielectric 214. This dielectric 214 is typically a plastic or an adhesive, or any other suitable dielectric material as is known in the art.

Preferably, the ring conductor 212 covers the majority of the conductive antenna components or coil 202 as shown in FIG. 2, leaving a small gap 216 or open space that does not cover the coil 202. The shape and size of the split ring conductor 212 is designed as part of the overall microwave safe RFID tag device's 200 structure to provide a controlled interaction with the microwave field to minimize heating and prevent arcing. Typically, the design of the split ring conductor 212 varies, and any suitable shaped conductor as is known in the art can be used. Further, common features of the split ring conductor 212 would be rounded corners, defined lengths of sides compared to a wavelength at the microwave frequency, and controlled gaps between ring elements, i.e., coils 202.

The split ring conductor 212 capacitively couples to the coil 202 via the dielectric 214. For example, for a 10 mm square area and a 25 μm thick dielectric of k=3, the capacitance is ~106 pF (picofarads). At 13.56 MHz, the equivalent coupling impedance to the coil 202 is 110 ohms, which will have minimal impact on the coil operation. At 2.45 GHz, the coupling impedance is ~0.61 ohms, effectively shorting the coil and ring. This prevents arcs between the coil elements and excessive currents flowing over the full length in the coil conductors 202. Thus, prevention of the arc reduces energy applied to the microwave safe RFID tag 200, and heating of the microwave safe RFID tag 200 is then minimized as well. Accordingly, the microwave safe RFID tag 200 can be read before or during the high-power microwave emission, i.e., 2.45 GHz.

The ring conductor 212 is split (or gap) 216 to prevent it acting as a shorted turn, where it magnetically interacts with the coil antenna 202 as current will flow in it when it is placed in a magnetic field. In the region of the split (or gap) 216, the microwave current flows through the coil conductors 202 over a length defined by the gap 216 in the ring conductor 212 as on either side the coil conductors 202 are strongly coupled to the ring conductor 212. The size of the gap 216 is chosen such that any structure of the coil 202 in the gap 216 will not interact with the microwave field; for the purposes of this invention this should be less than one tenth of a wavelength at the microwave frequency, or approximately 12 mm.

Additionally, the RFID chip 208 of the microwave safe RFID tag 200 carries data related to the process the microwave oven is required to perform. Specifically, data received from the RFID chip 208 may include, but is not limited to, a unique identifier for the RFID tag 200, product identification, product "use by" data, product "consume by" date, allergen information, cooking parameters for the food, instructions such as heat, stir, and dwell time after heating, etc.

For example, with respect to expired product "use by" or "consume by" dates, the RFID chip 208 could be used to prevent the microwave from operating to thaw, cook, heat or reheat the food without a manual override, thereby preventing the user from unknowingly consuming food that is no longer fit for consumption and preventing illness. This feature is particularly useful when, for example, the printed on information containing the product "use by" or "consume by" dates is no longer readable by the human eye, or gets separated from the food product.

Additionally, the needed authorization to override the RFID chip 208 could be different for different food products and/or for different users. For example, the override needed for foods for infants, seafood, or foods with particular known allergens (e.g., foods that have peanuts) could be considered high risk and could require a specific password, rather than a simple yes/no or verbal confirmation. Further, this particular product data can also be combined with data about the user, such as allergen information, to preventing cooking actions, sound an alarm, ask for verbal confirmation, etc. Further, the RFID chip 208 can also be associated with a sensor that can detect whether the food product is thawed, chilled or frozen, and information or output from the sensor could, in turn, be used to modify the cooking parameters appropriately without further user interaction. For example, for frozen food products, the sensor output could be used to instruct the microwave oven to first thaw the food product at one microwave power setting, and then cook the food product at a different power setting. Alternatively, if the food product is determined by the sensor to already be thawed, the sensor output may be used to instruct the microwave oven to bypass the thaw process and proceed straight to the cooking process, thereby saving both time and the energy necessary to operate the microwave oven during the thaw process.

Figure 3:
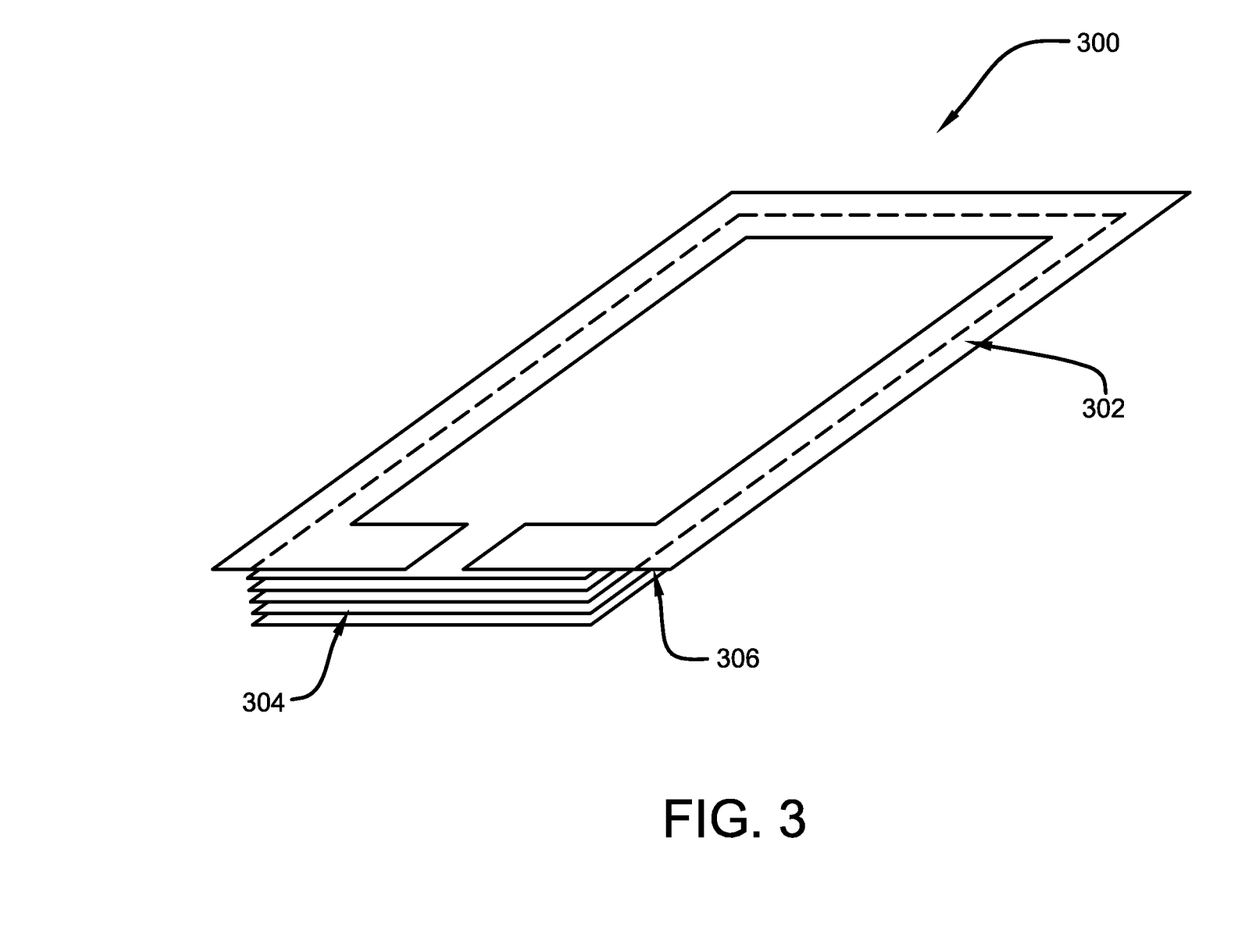
FIG. 3 illustrates a perspective view of a microwave safe RFID tag with a HF coil antenna in accordance with the disclosed architecture.

In another embodiment as shown in FIG. 3, the microwave safe RFID tag device 300 is shown with the shield conductor 302 in proximity to the HF RFID coil antenna (or coil conductor) 304. Further, the shield conductor 302 is separated from the coil conductor 304 via a dielectric (or substrate) 306, such as a plastic or adhesive, etc., or any other suitable material as is known in the art. Additionally, the microwave safe RFID tag device 300 can be made in a variety of ways. For example, the shield conductor 302 and the coil conductor 304 can be positioned on opposite surfaces of a substrate (or dielectric) 306 such as a PET substrate 306 wherein the coil conductor 304 is etched on one side of the PET substrate 306 and the shield conductor 302 is etched on the other.

Or, the shield conductor 302 and the coil conductor 304 can be positioned on opposite surfaces of a PET substrate 306 where the coil conductor 304 is laser cut on one side of the PET substrate 306 and the shield conductor 302 is laser cut on the other side of the PET substrate 306. Or, the shield conductor 302 and the coil conductor 304 can be positioned on opposite surfaces of a PET substrate 306 where the coil conductor 304 is laser cut on one side of the PET substrate 306 and the shield conductor 302 is die cut on the other side of the PET substrate 306. Or, the shield conductor 302 and the coil conductor 304 can be positioned on opposite surfaces of a PET substrate 306 where the coil conductor 304 is laser cut or etched on one surface of the PET substrate 306 and the shield conductor 302 is previously cut and applied with an adhesive to the other surface of the PET substrate 306.

Alternatively, the shield conductor 302 and the coil conductor 304 can be on the same surface of a PET substrate 306 where the coil conductor 304 is laser cut or etched on one surface of the PET substrate 306 and the shield conductor 302 is previously cut and applied as an additive component with an adhesive to the same surface of the PET substrate 306. Or finally, the shield conductor 302 and the coil conductor 304 can be either on the same or on opposite surfaces of the PET substrate 306 where the shield conductor 302 is applied as a printed structure, either on the back of the PET substrate 306 or on top of the coil conductor 304 with a suitable dielectric separator such as a varnish in between, or any other suitable dielectric material as is known in the art.

Figure 4:
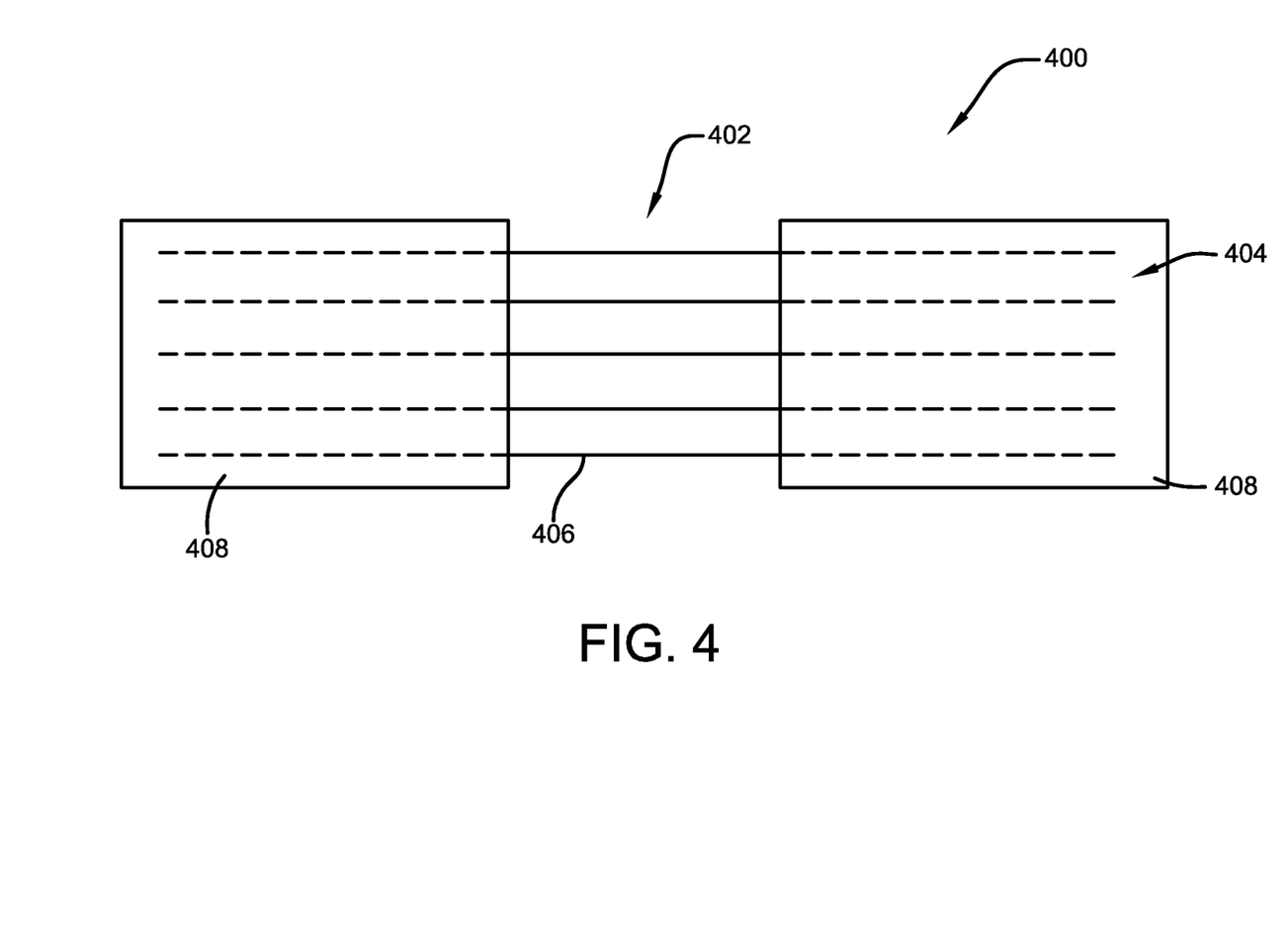
FIG. 4 illustrates a front perspective view of the gap between the shield conductor of the microwave safe RFID tag in accordance with the disclosed architecture.

FIG. 4 provides a view of the microwave safe RFID tag 400, specifically the area where the gap 402 in the split ring (or shield) conductor 404 is over the HF coil antenna conductor 406. The gap 402 discloses a large overlap area 408 on either side. The large overlap area 408 provides a low impedance coupling to the coil antenna conductor 406 on either side of the coil turns, as they are shorted together capacitively by the shield conductor 404. Thus, the shield conductor 404 acts as a single wide conductor capable of carrying the current across the gap 402. This prevents arcs between the coil elements (or turns) and excessive current flowing over the full length of the coil antenna conductor 406. In the gap 402 area, the microwave current flows through the coil elements over a length defined by the gap 402, as on either side the coil antenna conductor 406 is strongly coupled to the split ring conductor 404. The size of the gap 402 is chosen such that any structure of the coil elements in the gap 402 will not interact with the microwave field, for example, the size of the gap 402 should be less than one tenth of a wavelength at the microwave frequency, or approximately 12 mm.

Figure 5:
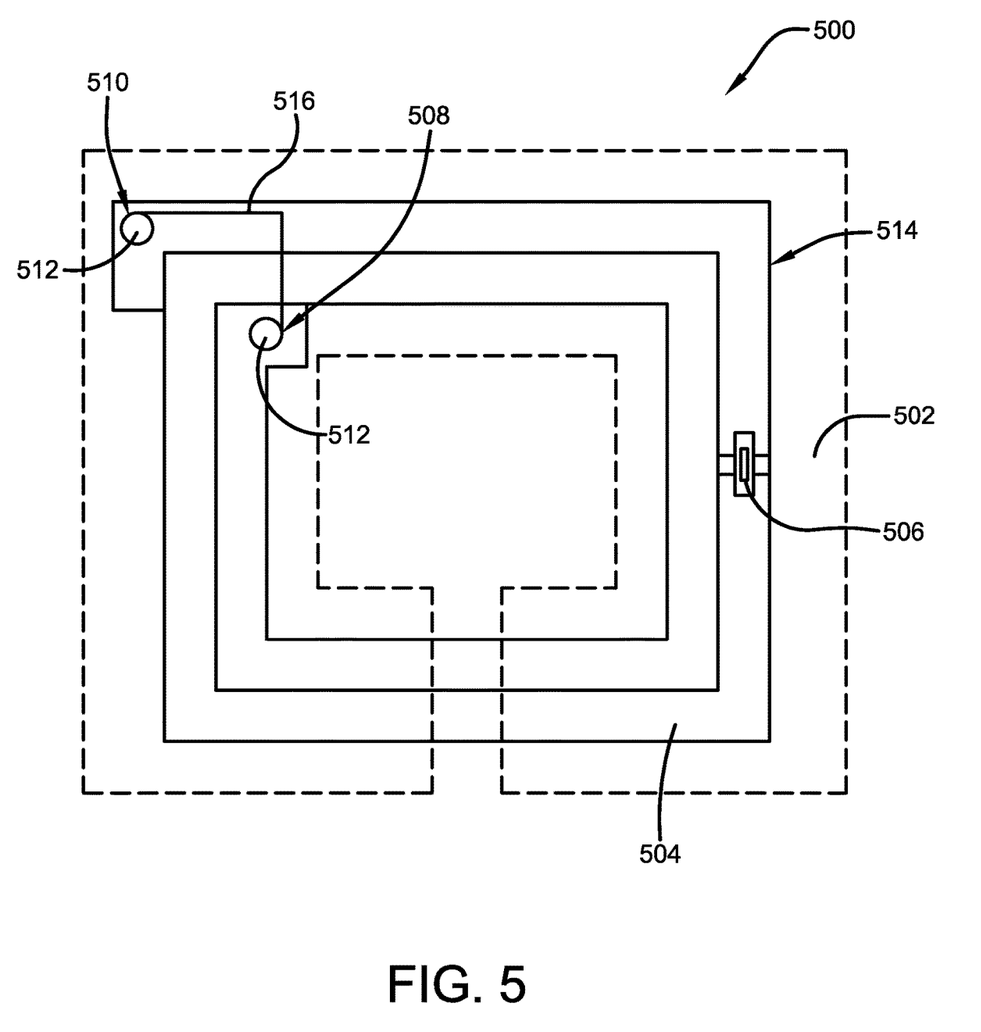
FIG. 5 illustrates a top perspective view of a microwave safe RFID tag with shield formed on opposite side of substrate and with connections to bridge conductors in accordance with the disclosed architecture.

FIG. 5 shows a further embodiment of the microwave safe RFID tag device 500 comprising a split ring (or shield) conductor 502 formed on one side of a substrate (or dielectric) 514, a coil antenna conductor 504 formed on an opposite side of the substrate 514, and a RFID chip 506. In the microwave safe RFID tag device 500, the split ring shield conductor 502 also acts as a HF bridge 516 between the center 508 and edge 510 of the coil antenna conductor 504 to make a continuous conductor to resonate with the RFID chip 506 at 13.56 MHz. The bridging function is made by providing a low resistance (i.e., 10 ohm) path using crimped connections 512 between top and bottom conductors (i.e., shield conductor 502 and coil antenna conductor 504), or other connective means such as plated through holes, etc., or any other suitable connective means as is known in the art. In the event that the shield conductor 502 is applied directly over the coil antenna conductor 504 as an additive conductor without a substrate 514 positioned in between, the connection may be made by a suitable conductive adhesive as is known in the art.

Figure 6A:
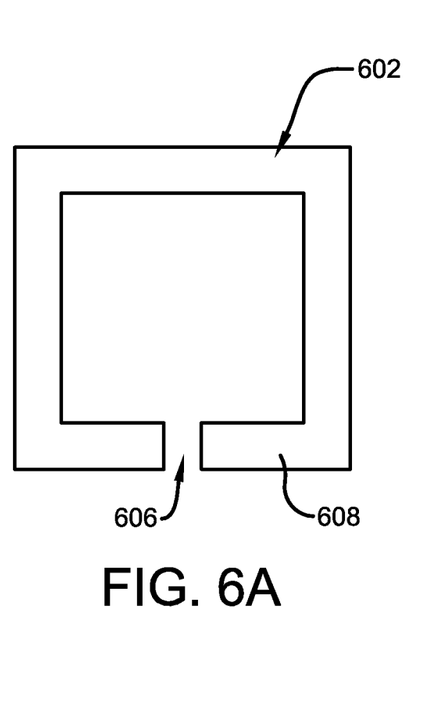
FIG. 6A illustrates a top perspective view of a bottom shield conductor of the microwave safe RFID tag in accordance with the disclosed architecture.
Figure 6B:
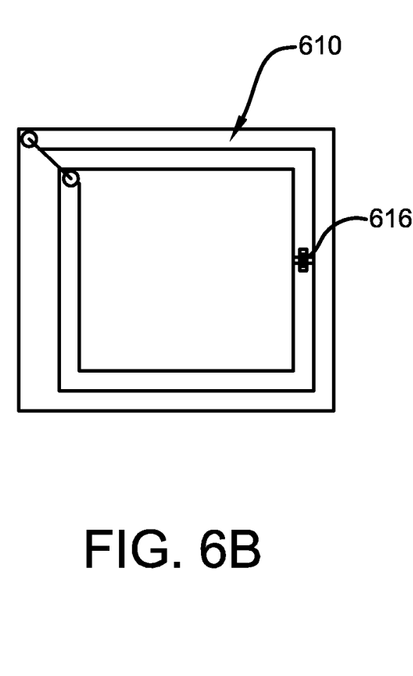
FIG. 6B illustrates a top perspective view of a HF RFID inlay of the microwave safe RFID tag in accordance with the disclosed architecture.
Figure 6C:
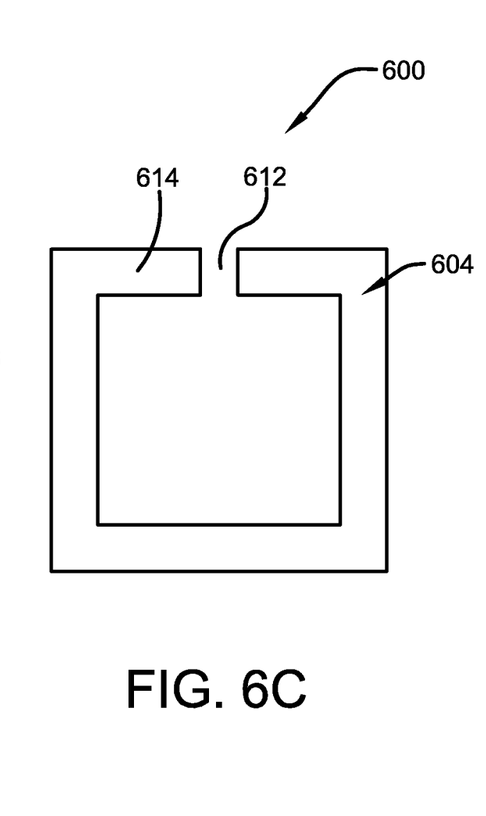
FIG. 6C illustrates a top perspective view of a top shield conductor of the microwave safe RFID tag in accordance with the disclosed architecture.

FIGS. 6A-C show a further embodiment of the microwave safe RFID tag device 600 comprising two split ring shields (shield 1 602 and shield 2 604), a HF RFID coil antenna conductor (or HF RFID inlay) 610, and an RFID chip 616. The microwave safe RFID tag device 600 comprises a first split ring (or shield) conductor (shield 1) 602 with a gap 606 formed on the bottom edge 608 of the shield 1 conductor 602 and wherein the shield 1 conductor 602 is positioned on one side of the coil antenna conductor 610. The microwave safe RFID tag device 600 also comprises a second split ring (or shield) conductor (shield 2) 604 with a gap 612 formed on the top edge 614 of the shield 2 conductor 604 and wherein the shield 2 conductor 604 is positioned on the opposite side of the coil antenna conductor 610.

By having the two shield conductors (namely, shield 1 602 and shield 2 604) rotated relative to each other, the gaps 606 and 612 of the shield conductors (602 and 604) are positioned in different locations. Thus, although both of the shield conductors (602 and 604) do not present a shorted turn to the coil antenna conductor 610, as the gaps (606 and 612) in shield 1 and shield 2 (602 and 604) are in different locations, no current flows in the coil antenna conductor 610 at either point as they bridge each other at 2.45 GHz. Accordingly, the microwave safe RFID tag device 600 with two shield conductors (602 and 604) minimizes current flow in the coil antenna conductor 610.

Figure 7:
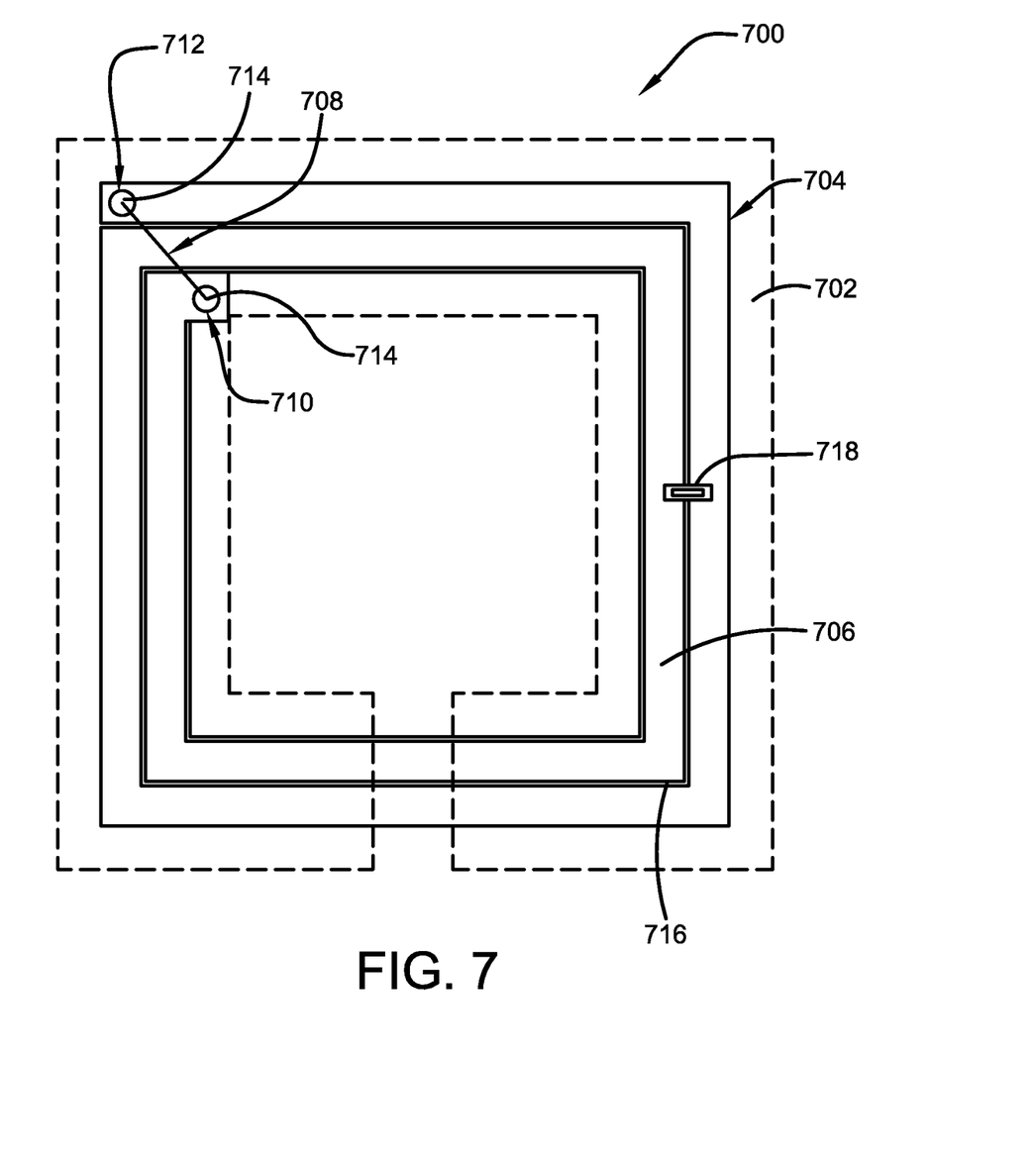
FIG. 7 illustrates a top perspective view of a microwave safe RFID tag wherein the small laser cut gaps are created between the coil conductor in accordance with the disclosed architecture.

FIG. 7 shows a further embodiment for a microwave safe RFID tag device 700 comprising a split ring (or shield) conductor 702 formed on one side of a substrate (or dielectric) 704, a coil antenna conductor 706 formed on an opposite side of the substrate 704, and a RFID chip 718. In the microwave safe RFID tag device 700, the coil antenna conductor 706 also acts as a HF bridge 708 between the center 710 and edge 712 of the coil antenna conductor 706 to make a continuous conductor to resonate with the RFID chip 706 at 13.56 MHz. The bridging function is made by providing a low resistance (i.e., 10 ohm) path using crimped connections 714 or other connective means such as plated through holes, etc., or any other suitable connective means as is known in the art.

Furthermore, the coil antenna conductor 706 comprises small gaps 716, in the region of 10 µm to 100 µm or any other suitable size as is known in the art. The small gaps 716 are used to isolate the turns of the coil of the coil antenna conductor 706. As the gaps 716 are small, the coupling capacitance between coil turns is a low impedance at 2.45 GHz, making the coil of the coil antenna conductor 706 look like a solid ring at 2.45 GHz with no gaps to prevent arcing.

Figure 8A:
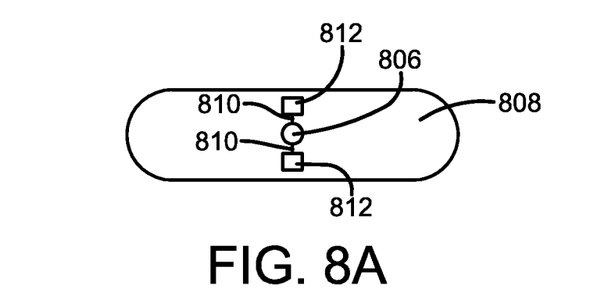
FIG. 8A illustrates a top perspective view of a shielded strap in accordance with the disclosed architecture.
Figure 8B:
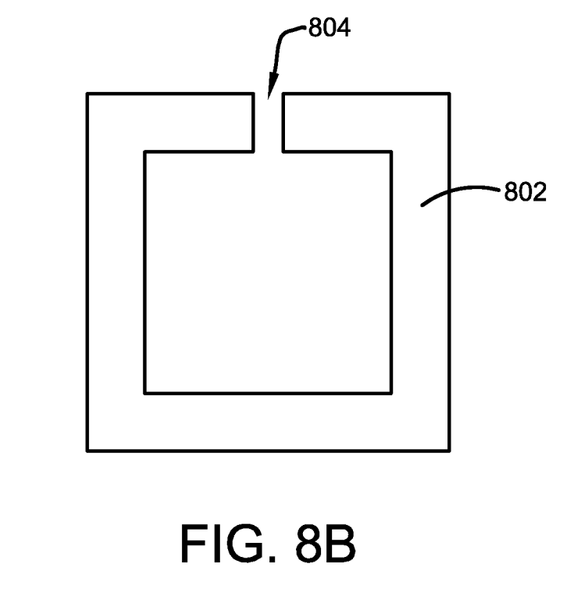
FIG. 8B illustrates a top perspective view of a shield conductor to be placed over the strap in accordance with the disclosed architecture.
Figure 8C:
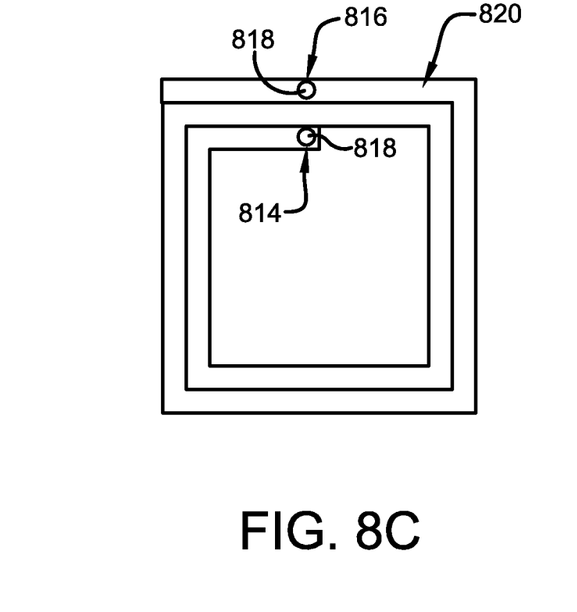
FIG. 8C illustrates a top perspective view of a coil conductor of the microwave safe RFID tag in accordance with the disclosed architecture.

FIGS. 8A-C discloses an embodiment of the microwave safe RFID tag device 800 comprising a RFID chip 806 connected to a strap 808, wherein the RFID chip 806 and strap 808 are positioned on a coil antenna conductor 820, and a split ring (or shield) conductor 802 is formed on top of the RFID chip 806 and strap 808. Specifically, the RFID chip 806 is connected to two lines 810 and two pads 812 designed to connect (or bridge) it to the center 814 and outside edge 816 of the coil antenna conductor 820, giving a resonant circuit. The bridging (or connection) function is made by using crimped connections 818 or other connective means such as plated through holes, etc., or any other suitable connective means as is known in the art to connect with the two lines 810 and two pads 812 of the RFID chip 806.

Further, the strap 808 incorporates a top shield metalization which creates a shielded strap 808. This shielded strap 808 acts as a continuous conductor over the coil antenna conductor 820. Additionally, the shield conductor 802 comprises a split ring (or gap) 804 as described above and is placed on top of the coil antenna conductor 820, with the gap 804 in the ring (or shield) conductor 802 shorted across at 2.45 GHz by the shielded strap 808 and capacitive coupling. Thus, this microwave safe RFID tag device 800 prevents any current from flowing in the coil antenna conductor 820 at the point where there is the gap 804 in the split ring shield conductor 802 to prevent arcing.

Importantly, data contained on RFID chip 806, such as "use by" or "consume by" data may be combined with other data, either from the manufacturer or relating to a particular user, to activate different cooking parameters, authorization levels necessary to override a cooking parameter, etc. Data relating to the user can include, but is not limited to, information regarding allergic reactions, time of day when cooking, age of the user, etc. This data, along with the manufacturer data and/or product data, acts to control if a particular microwave operation (e.g., thawing, heating, reheating, cooking, etc.) is authorized and, in the event it is not directly authorized, it requires further action from the user. Said further action by a user can include entering a password, using a RFID card, using a near field communication (NFC) enabled phone, etc., or any other suitable action as is known in the art for taking action.

More specifically, the process may begin with RFID tag 800 being read or interrogated and data concerning the RFID tagged product collected and analyzed. RFID tag 800 may be read or interrogated either inside or outside of the microwave cavity, depending on the particular RFID reader system being utilized. Based on said gathered data it can then be determined if the data read from RFID tag 800 shows that the tagged product is out of date (i.e., beyond its "best if used by" or "consume by" date). If the product is not out of date, then the microwave process can continue and the microwave oven control panel controls the appropriate microwave function (e.g., thawing, heating, reheating or cooking) on the RFID tagged product. If, on the other hand, the product is out of date then, it may be further determined if the product is a critical product. Whether a product is a "critical product" can be defined by any number of user specified parameters. For example, "critical products" could include baby products, products that tend to cause food poisoning if out of date, etc. If the product is not a critical product, then the microwave process could proceed directly to the desired microwave function (i.e., thawing, heating, reheating, cooking, etc.) and the microwave oven control panel controls the desired microwave function.

For example, if the RFID tagged product is beyond its "best before date" (i.e., is out of date), but is not a critical product (e.g., based on a low probability of food poisoning), for example, vegetables, the microwave oven could proceed directly to the desired microwave function. This may occur with or without other parameters from the RFID tag, such as cooking instructions. If, on the other hand, the product is both out of date and a critical product then a manual override or some form of verification may be required to continue. For example, if the product was to fall into a critical product category, for example shellfish or baby food, the microwave oven would require further authorization to override the lock out, such as a password. The same process could apply to products of food items containing allergens. If a user had previously defined that a person with an allergy to, for example, peanuts might be using the microwave oven, any products presented to the microwave oven containing peanuts would require a high-level over-ride (e.g., a password) and possibly sound an alarm.

Another aspect could relate to the age of the user. For example, a product that indicates that it becomes very hot during cooking, such as those containing high-levels of sugar syrup, would require an over-ride if children were present in the house to prevent the child from overheating the food product and suffering burning or scalding from the same. After further authorization occurs, the process then proceeds directly to the desired microwave function (e.g., cooking, thawing, heating, reheating, etc.), and the microwave oven control panel controls the microwave process on the RFID tagged product. As previously discussed, differing levels of authorization could be established depending on the critical nature of the issue and/or the particular needs of the user.

As previously discussed, RFID tag 800 may further comprise some form of sensor. For example, sensor can be a temperature sensor that can indicate if the RFID tagged product is thawed, chilled or frozen, or any other sensor as is known in the art, such as a moisture sensor, etc. Based on the sensor state and RFID data, the microwave oven can then select an appropriate cooking method (i.e., based on whether the food item is, for example, already thawed, chilled or frozen) as determined by the oven controller which then utilizes the data read from the RFID tagged product to select the appropriate microwave function to be performed.

For example, for frozen food products, the output from the sensor could be used to instruct the microwave oven controller to first thaw the food product at one microwave power setting, and then cook the food product at a different power setting. Alternatively, if the food product is determined by the sensor to already be thawed, the sensor output may be used to instruct the microwave oven controller to bypass the thaw process, and proceed straight to the cooking process, thereby saving both time and the energy necessary to operate the microwave oven during the thaw process, which is not necessary in this particular application.

Additionally, tag data obtained from RFID tag 800 may trigger a look up from an online web service or external database for the correct cooking parameter for that specific food item. Specifically, the microwave oven controller may send user interface data to an online system/web service or external database to obtain additional information about the food item and how to prepare the same. For example, the web service can provide additional information regarding the food item, such as tips on how to best cook the food item in the microwave, the appropriate power setting to use, or whether the food item is better cooked thawed, chilled or frozen, etc. The cooking parameters can then be combined with user preferences for some food items, for example, preferences such as the state of how the meat should be prepared, or the desired softness of vegetables, bread, etc. The oven controller may then utilize both the cooking parameters from the web service or other external database along with the user preferences to control the microwave cooking process of the food item.

Figure 9:
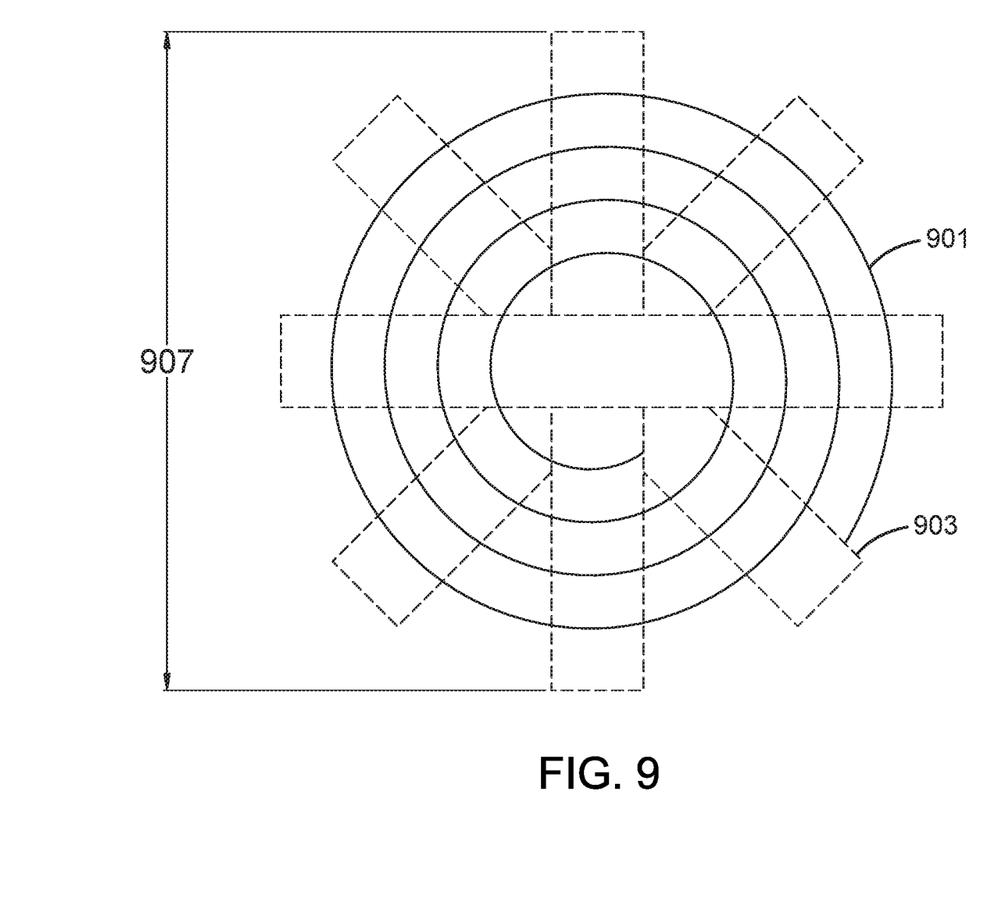
FIG. 9 illustrates an alternative starburst shield structure of the present invention.

FIG. 9 illustrates another embodiment of the present invention. FIG. 9 illustrates an alternative form of shield to the split rings described previously; as illustrated, the alternative form is a startburst 905, a series of lines radiating from a central point inside the coil to the space outside the coil. The line widths are made so that they give adequate coupling, such as capacitive coupling, to the lines of the coil so that they are shorted at 2.45 GHz, terminating the gaps in small arcs in the spaces between the gaps 901, but provide a relatively low coupling between the cons of the HF antenna to maintain performance. If the gaps are kept to a small proportion of a wavelength 907, for example lambda/20 or smaller, they interaction between the gaps and the 2.45 GHz energy is minimized. It will be appreciated that the number of arms on the starburst can vary depending on the required level of termination of the gaps.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A radio-frequency identification (RFID) tag tolerant of microwave emissions comprising:
   a RFID chip;
   an antenna conductor comprising an inductor, wherein the inductor comprises a center and an outer edge of the antenna conductor bridged together with a conductive trace;
   a split ring conductor comprising a gap that does not cover the antenna conductor, and the gap does not interact with microwave emissions,
   wherein a portion of the split ring conductor that covers the antenna conductor extends radially beyond both an inner edge and the center of the antenna conductor and the outer edge of the antenna conductor; and
   a dielectric positioned between the antenna conductor and the split ring conductor.

2. The RFID tag of claim 1, wherein the split ring conductor is capacitively coupled to the antenna conductor.

3. The RFID tag of claim 1, wherein the split ring conductor is formed on a first side of the dielectric and the antenna conductor is formed on an opposite side of the dielectric.

4. The RFID tag of claim 1, wherein the antenna conductor comprises a gap.

5. The RFID tag of claim 4, wherein the RFID chip is positioned in the gap.

6. The RFID tag of claim 1, wherein the split ring conductor covers a substantial portion of the antenna conductor.

7. The RFID tag of claim 1, wherein the antenna conductor is configured as concentric coils.

8. The RFID tag of claim 1, wherein a size of the gap is configured such that the coil in the gap will not interact with the microwave field.

9. The RFID tag of claim 1, wherein the size of the gap is less than one tenth of a wavelength at a microwave frequency of the microwave emissions.

10. A radio-frequency identification (RFID) tag for use in a microwave emission field comprising:
    an RFID chip;
    a coil antenna conductor comprising an inductor, wherein the inductor comprises a center and an outer edge of the coil antenna conductor bridged together with a conductive trace;
    a first split ring conductor;
    a second split ring conductor,
    wherein the first split ring conductor comprises a first gap and the second split ring conductor comprises a second gap,
    wherein the first split ring conductor and the second split ring conductor each have a respective portion that covers the antenna conductor and extends radially beyond both an inner edge and the center of the coil antenna conductor and beyond the outer edge of the coil antenna conductor, and
    wherein the first gap and the second gap allow the microwave current to flow through the coil antenna conductor.

11. The RFID tag of claim 10, wherein the coil antenna conductor is positioned between the first and the second split ring conductors.

12. The RFID tag of claim 10, wherein the coil antenna conductor is capacitively coupled to the first and the second split ring conductors.

13. The RFID tag of claim 10, wherein the second split ring conductor is rotated opposite of the first split ring conductor such that the first gap does not align with the second gap.

14. The RFID tag of claim 10, wherein said RFID chip is positioned in a gap in the coil antenna conductor.

15. A radio-frequency identification (RFID) tag for use in a microwave field comprising:
    a RFID chip secured to a shielded strap;
    a coil antenna conductor, wherein a center and an outer edge of the coil antenna conductor is bridged together with a conductive trace creating an inductor; and
    a split ring conductor,
    wherein a portion of the split ring conductor that covers the coil antenna conductor extends radially beyond both an inner edge and the center of the coil antenna conductor and the outer edge of the coil antenna conductor.

16. The RFID tag of claim 15, wherein the RFID chip and the shielded strap are positioned on the coil antenna conductor.

17. The RFID tag of claim 16, wherein the split ring conductor is positioned on top of the RFID chip and the shielded strap.

18. The RFID tag of claim 15 further comprising a resonant circuit.

19. The RFID tag of claim 15 wherein the split ring conductor is capacitively coupled to the coil antenna conductor.

* * * * *